United States Patent

[11] 3,621,022

[72] Inventors: Herbert Berger, Mannheim-Kafertal; Rudi Gall, Grossachsen; Merdes, Hartmut, Heidelberg; Kurt Stach, Mannheim-Waldhof; Wolfgang Voemel, Mannheim; Winfriede Sauer, Mannheim-Wallstadt, all of Germany
[21] Appl. No.: 783,715
[22] Filed: Dec. 13, 1968
[45] Patented: Nov. 16, 1971
[73] Assignee: Boehringer Mannheim GmbH, Mannheim, Germany
[32] Priority: Jan. 20, 1968
[33] Germany
[31] P 16 70 307.4

[54] ANTIBACTERIAL 5-NITROFURYL-PYRIMIDINES
8 Claims, No Drawings

[52] U.S. Cl. .................................................. 260/251 R, 260/256.4 C, 260/256.4 N, 260/257, 260/260, 424/251
[51] Int. Cl. ............................................... C07d 51/38
[50] Field of Search ........................................... 260/251, 257, 260, 256.4 C, 256.4 N

[56] References Cited
UNITED STATES PATENTS
3,096,332  7/1963  Von Esch et al. .............. 260/251

Primary Examiner—Alex Mazel
Assistant Examiner—R. V. Rush
Attorney—Burgess, Dinklage & Sprung ABSTRACT: Novel 5-nitrofuran derivatives and the physiologically acceptable salts thereof having the formula:

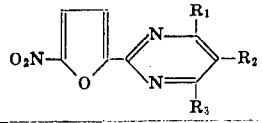

wherein $R_1$ and $R_2$ each represent hydrogen, hydroxyl, lower alkyl, alkoxy, amino or acylamino, and $R_3$ is hydrogen, hydroxyl, lower alkoxy, amino or acylamino.

The 5-nitrofuran derivatives of the above formula constitute particularly effective antibacterial agents and are particularly useful in the treatment of urinary track infections.

ANTIBACTERIAL 5-NITROFURYL-PYRIMIDINES

This invention relates to 5-nitrofuran derivatives, methods of producing and using the same.

According to the present invention there is provided a novel group of 5-nitrofuran derivatives of the formula:

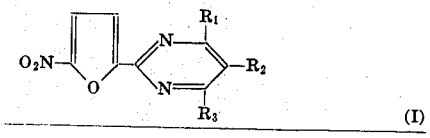

(I)

wherein $R_1$ and $R_2$, which can be the same or different, are each hydrogen, hydroxyl, lower alkyl, alkoxy, amino or acylamino and $R_3$ is hydrogen, hydroxyl, lower alkoxy, amino or acylamino and the physiologically compatible salts thereof.

It is to be understood that those compounds (I) in which $R_3$ is hydroxyl can also be present in the tautomeric lactam form.

THe novel-5-nitrofuran derivatives (I) according to the present invention are characterized by their antimicrobial action.

In U.S. Pat. No. 3,096,332, there are disclosed 2-(5-nitro-2-furyl)-pyrimidine derivatives, similar to the compounds of the invention. These compounds possess in vitro a certain activity against bacteria but in animal experiments have proved to be substantially inactive (see J. Med. Chem., 8, 26/1965).

In accordance with the invention it has now been found that the new 5-nitrofuran (I) are not only effective in vitro, but, surprisingly, also possess an outstanding antibacterial action in vivo. The new compounds according to the present invention are, in particular, outstandingly effective in the treatment of infections of the urinary tract.

The 2-(5-nitro-2-furyl)-pyrimidine derivatives of structural formula (I) in which $R_1$ is hydrogen, methyl or methoxy, $R_2$ is hydrogen, lower alkyl, amino or acetylamino and $R_3$ is hydroxyl, hydrogen, methoxy or acetylamino or amino have proved to be particularly effective antibacterial agents.

The novel 5-nitrofuran derivatives according to the present invention can be prepared, for example, by one of the following methods:

a. Nitration of a furan derivative having the following formula:

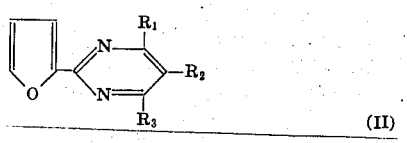

(II)

wherein $R_1$, $R_2$ and $R_3$ have the same significances as given above, and where $R_1$, $R_2$ and $R_3$ are to designate hydroxyl or amino, any alkoxy or acylamino groups which may be present are thereafter saponified;

b. When $R_1$ is to designate hydrogen, hydroxyl or lower alkyl, $R_2$ is to designate hydrogen, lower alkyl or a possible acylated amino group and $R_3$ is to designate hydrogen or hydroxyl condensation of 5-nitro-furamidine with a β-dicarbonyl compound of the formula:-

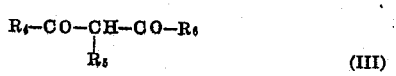

(III)

wherein $R_4$ represents hydrogen, lower alkyl or alkoxy, $R_5$ represents hydrogen, lower alkyl or acylamino and $R_6$ represents hydrogen, hydroxyl or alkoxy or with a functional derivative thereof, whereafter, if desired, the acylamino radical is saponified;

c. When $R_1$ and $R_1$ are to designate hydrogen or lower alkyl and $R_3$ is to designate hydroxyl or lower alkoxy, hydrolysis or alcoholysis of a 5-nitrofuran derivative of the formula:

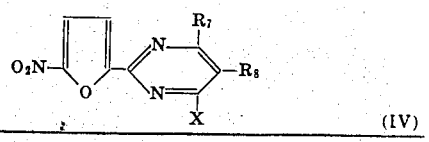

(IV)

wherein $R_7$ and $R_8$ each represent hydrogen or lower alkyl and X is halogen.

When products are obtained in which one or more of the substituents $R_1$, $R_2$ and $R_3$ is an amino group, then, if desired, these products can be converted into physiologically compatible salts by reaction with appropriate inorganic or organic acids.

Acid addition salts of the 5-nitrofuran derivatives of the invention are formed by contacting the 5-nitrofuran derivatives with a mineral or organic acid such as hydrochloric acid, sulfuric acid, formic acid, acetic acid, citric acid, maleic acid, fumaric acid, phosphoric acid, tartaric acid, benzoic acid, cinnamic acid, succinic acid, mandelic acid and so forth.

The nitration of the furan derivatives (II) is advantageously carried out with a nitration mixture of nitric acid, sulfuric acid and acetic anhydride. Amino groups which are sensitive to oxidation are thereby simultaneously acetylated and protected against attack by the nitric acid. After the nitration has taken place, the N-acetyl groups can, if desired, be split off hydrolytically, for example, with methanolic hydrochloric acid. The saponification of any alkoxy radicals which may be present can, if desired, be carried out in the conventional manner for example using a mixture of a hydrohalic acid, such as hydrobromic acid, and glacial acetic acid. When the N-acetyl compounds are heated for a comparatively long period of time in strongly acidic solution, not only is the acetyl group split off but the amino compounds initially formed are hydrolyzed to form the corresponding hydroxy compounds.

The condensation according to the present invention of 5-nitro-furamidine with the β-dicarbonyl compounds (III) is preferably carried out with the use of a basic catalyst, such as an alkali metal alcoholate. It is not known whether the compounds (III) thereby react in the keto or enol form. Typical functional derivatives of compounds (III) are the acetals, as well as the enamines and the halo derivatives of the enol form, as for example, β-chloroacrolein.

In the case of the hydrolysis of compounds (IV), when a mixture of glacial acetic acid and sodium acetate is used, there are obtained after neutralization, the corresponding 4-hydroxy-pyrimidine derivatives. The alcoholysis, which is advantageously carried out in an anhydrous alkali metal alcoholate solution results in the formation of corresponding 4-alkoxy-pyrimidine derivatives.

The furan derivatives (II) used as starting materials can be prepared, for example, by the reaction of furamidine with appropriately substituted β-dicarbonyl compounds, any free amino groups which may be present advantageously being acylated prior to the condensation. A particularly simple variation of this process makes use of β-carbonyl-carboxylic acid esters or of β-substituted β-dicarboxylic acid esters, the corresponding 2-hydroxy- or 2,4-dihydroxy-pyrimidines being thereby initially obtained. These are thereafter converted into the 2-chloro- or 2,4-dichloro-pyrimidine derivatives by reaction with an inorganic acid chloride, such as phosphorus oxychloride. The chlorine atoms can then be partially or wholly replaced by hydrogen atoms by means of catalytic hydrogenation or by amino groups by reaction with ammonia or by alkoxy radicals by reaction with alkali metal alcoholates or by hydroxyl groups by reaction with water.

The starting compounds (IV) can be obtained by the nitration of those compounds having structural formula (II) in which $R_3$ is a halogen atom.

The especially preferred physiologically compatible salts of the amino group-substituted 2-(5-nitro-2-furyl)-pyrimidine derivatives (I) are the hydrochlorides, sulfates, phosphates, tartrates, citrates and oxalates, these salts being prepared in known manner, for example, by neutralization with the appropriate acids. The following examples will illustrate the present invention without limiting the latter thereto.

EXAMPLE 1

2-(5-Nitro-2-furyl)-4-methyl-pyrimidine

Five g. 2-(2-furyl)-4-methyl-pyrimidine were suspended in 50 ml. acetic anhydride. A nitration mixture which consisted of 5 g. nitric acid, 70 ml. acetic anhydride and 70 ml. concentrated sulfuric acid was added in dropwise fashion to the resulting suspension under stirring, at a temperature of −10° C. When the addition of the nitration mixture had been completed, the reaction mixture was stirred for 1 additional hour at the same temperature and then poured onto ice, neutralized and the precipitated crystals filtered off with suction. Following washing and drying, there were obtained 4 g. (62 percent of theory) of paper chromatographically uniform 2-(5-nitro-2-furyl)-4-methyl-pyrimidine which, following recrystallization from alcohol/dimethyl formamide, had a melting point of 198°–206° C. The NMR and infrared spectra analyses confirmed the structure of the product.

The 2-(2-furyl)-4-methyl-pyrimidine used as starting material was prepared by the reaction of furamidine hydrochloride with sodium acetoacetic ester in alcohol, subsequent chlorination with phosphorus oxychloride and catalytic hydrogenation of the 2-(2-furyl)-4-methyl-6-chloropyrimidine (m.p. 34°–37° C.) obtained as an intermediate. There was obtained an oil which, in the cold, crystallized slowly (m.p. 35°–38° C.) and the structure of which was confirmed by the NMR spectrum.

The following compounds were obtained in an analogous manner:

2-(5-nitro-2-furyl)-pyrimidine: m.p. 214°–219° C.

As starting material, there was used 2-(2-furyl)-pyrimidine (m.p. 66°–69° C.) which had been prepared by the reaction of 2-(2-furyl)-4,6-dihydroxypyrimidine, the latter obtained according to the method described in J.C.S., 1943, 388, with phosphorus oxychloride, followed by catalytic hydrogenation of the 2-(2-furyl)-4,6-dichloropyrimidine (m.p. 68°–71° C.) which was obtained as an intermediate.

2-(5-nitro-2-furyl)-4-methoxy-5-methyl-pyrimidine: m.p. 160°–165° C.

As starting material, there was used 2-(2-furyl)-4-methoxy-5-methyl-pyrimidine (m.p. 79°–81° C.) which had been prepared by the following reaction: 2-(2-furyl)-5-methyl-4-(3H)-pyrimidinone (m.p. 215°–217° C.), obtained by the condensation of furamidine hydrochloride with the sodium salt of α-formyl-propionic acid ethyl ester was reacted with phosphorus oxychloride to give 2-(2-furyl)-4-chloro-5-methyl-pyrimidine (m.p. 145°–148° C.). The alcoholysis of this intermediate with sodium methylate in methanol yielded 2-(2-furyl)-4-methoxy-5-methyl-pyrimidine.

2-(5-nitro-2-furyl)-5-methyl-pyrimidine: m.p. 226°–229° C.

As starting material, there was used 2-(2-furyl)-5-methyl-pyrimidine: (m.p. 87°–90° C.), which had been prepared by the catalytic hydrogenation of 2-(2-furyl)-4-chloro-5-methyl-pyrimidine.

2-(5-nitro-2-furyl)-4-methyl-6-(1H)-pyrimidinone: m.p. 248°–252° C. (decomp.)

As starting material, there was used 2-(2-furyl)-4-methyl-6-(1H)-pyrimidinone (m.p. 35°–38° C.).

2-(5-nitro-2-furyl)-4,5-dimethyl-6-(1H)-pyrimidinone: m.p. 284°–289° C. (decomp.)

As starting material, there was used 2-(2-furyl)-4,5-dimethyl-6-(1H)-pyrimidinone (m.p. 227°–232° C.), which had been obtained by the condensation of furamidine hydrochloride with the sodium salt of α-methyl acetoacetic ester in alcohol.

2-(5-nitro-2-furyl)-5-ethyl-4-(3H)-pyrimidinone: m.p. 224°–230° C.

As starting material, there was used 2-(2-furyl)-5-ethyl-4-(3H)-pyrimidinone (m.p. 157°–160° C.), which had been prepared by the condensation of furamidine hydrochloride with the sodium salt of α-formyl butyric acid ethyl ester.

2-(5-nitro-2-furyl)-4,5-dimethyl-pyrimidine: m.p. 193°–196° C.

As starting material, there was used 2-(2-furyl)-4,5-dimethyl-pyrimidine (m.p. 116°–120° C.), which had been obtained by the reaction of 2-(2-furyl)-4,5-dimethyl-6-(1H)-pyrimidinone with phosphorus oxychloride followed by catalytic hydrogenation of the resultant chloro compound (m.p. 112°–116° C.).

2-(5-nitro-2-furyl)-4-(3H)-pyrimidinone: m.p. 300° C. (decomp.)

As starting material, there was used 2-(2-furyl)-4-(3H)-pyrimidinone: (m.p. 200°–204° C.), which was prepared by the following reaction: tfuramidine hydrochloride was condensed with the sodium slat of malonic acid diethyl ester and the 2-(2-furyl)-4,6-dihydroxy-pyrimidine thereby obtained reacted with phosphorus oxychloride. Following partial hydrolysis of the 2-(2-furyl)-4,6-dichloropyrimidine formed, there was recovered 2-(2-furyl)-4-hydroxy-6-chloropyrimidine (m.p. 239°–241° C.). By catalytic hydrogenation of the latter compound there was obtained 2-(2-furyl)-4-(3H)-pyrimidinone.

2-(5-nitro-2-furyl)-4-acetamino-5methyl-pyrimidine: m.p. 225° C.

As starting material, there was used 2-(2-furyl)-4-acetamino-5-methyl-pyrimidine (m.p. 181°–182° C.), which had been prepared by the following reaction: furamidine hydrochloride was condensed with the sodium salt of methyl malonic acid diethyl ester and the 2-(2-furyl)-5-methyl-4,6-dihydroxy-pyrimidine thereby obtained reacted with phosphorus oxychloride to give 2-(2-furyl)-5-methyl-4,6-dichloropyrimidine (m.p. 114°–117° C.). Following ammonolysis, at a temperature of 120° C., using aqueous ammonia, in an autoclave, there was obtained therefrom 2-(2-furyl)-5-methyl-4-amino-6-chloropyrimidine (m.p. 230°–233° C.). This latter compound was then reacted with acetic anhydride to give 2-(2-furyl)-4-acetamino-5-methyl-6-chloropyrimidine (m.p. 199°–200° C.). By the catalytic hydrogenation thereof, there was obtained 2-(2-furyl)-4-acetamino-5-methyl-pyrimidine.

2-(5-nitro-2-furyl)-5-acetamino-pyrimidine: m.p. 280° C. (decomp.)

As starting material, there was used 2-(2-furyl)-5-acetamino-pyrimidine [m.p. 286° C. (decomp.)], which was obtained by the condensation of furamidine hydrochloride with 2-nitromalonic dialdehyde, reduction of the 2-(2-furyl)-5-nitro-pyrimidine (m.p. 240°–241° C.) thereby obtained to give 2-(2-furyl)-5-amino-pyrimidine (m.p. 194°–197° C.) and subsequent acetylation with acetic anhydride.

EXAMPLE 2

2-(5-Nitro-2-furyl)-4-amino-5-methyl-pyrimidine

Utilizing the 2-(5-nitro-2-furyl)-4-acetamino-5-methyl-pyrimidine obtained by the procedure described in example 1, there was first obtained the hydrochloride of 2-(5-nitro-2-furyl)-4-amino-5-methyl-pyrimidine by boiling for 1 hour in methanalic solution which had been saturated with hydrogen chloride. Following neutralization with sodium bicarbonate and recrystallization of the product from dimethyl formamide, there was recovered in 68 percent yield, the free amino compound. The 2-(5-nitro-2-furyl)-4-amino-5-methyl-pyrimidine melted, with decomposition at 325°–330° C.

Using an analogous method, 2-(5-nitro-2-furyl)-5-amino-pyrimidine [m.p. 285°–295° C. (decomp.)] was prepared by the saponification of 2-(5-nitro-2-furyl)-5-acetamino-pyrimidine with methanolic hydrochloric acid followed by neutralization of the thusly obtained product.

EXAMPLE 3

2-(5-Nitro-2-furyl)-5-methyl-4-(3H)-pyrimidinone

Variant A:

Five g. 2-(2-furyl)-5-methyl-4-(3H)-pyrimidinone were suspended in 50 ml. acetic anhydride. A nitration mixture which consisted of 3.4 ml. concentrated nitric acid, 50 ml.

acetic anhydride and 50 ml. concentrated sulfuric acid was added in dropwise fashion under stirring, at a temperature of −10° C. The reaction mixture was then stirred for a further hour at −10° C., poured onto ice and the precipitated crystals filtered off using suction. After washing and drying, there were obtained 3.7 g. (59 percent of theory) of the paper chromatographically pure nitro compound, the structure of which was confirmed spectroscopically. Following recrystallization from alcohol/dimethyl formamide, the 2-(5-nitro-2-furyl)-5-methyl-4-(3H)-pyrimidinone which was obtained had a melting point of 305°–315° C. (decomp.)

The 2-(2-furyl)-5-methyl-4-(3H)-pyrimidinone (m.p. 215°–217° C.) used as starting material was prepared by the condensation of furamidine hydrochloride with the sodium salt of α-formyl-propionic acid ethyl ester.

Variant B:

2.8 g. 2-(5-nitro-2-furyl)-4-chloro-5-methyl-pyrimidine (m.p. 198°–199° C.) in admixture with 2 g. sodium acetate were boiled under reflux in 30 ml. glacial acetic acid until a sample as shown by means of a thin layer chromatogram, evidenced that the starting material had been completely hydrolyzed. Following cooling and neutralizing, the crystals obtained were filtered off with suction, washed and dried. There were thusly obtained 2.1 g. (81 percent of theory) 2-(5-nitro-2-furyl)-5-methyl-4-(3H)-pyrimidinone.

The 2-(5-nitro-2-furyl)-4-chloro-5-methyl-pyrimidine used as starting material was prepared by the reaction of 2-(2-furyl)-5-methyl-4-(3H)-pyrimidinone with phosphorus oxychloride (chloro compound: m.p. 145°–148° C.) followed by nitration of the chloro compound. After recrystallization from dimethyl formamide/water, the product had a melting point of 198°–199° C.

Variant C:

2-(5-nitro-2-furyl-4-methoxy-5-methyl-pyrimidine which had been prepared by the procedure described in example 1 was heated with 40 percent hydrogen bromide solution in glacial acetic acid. 2-(5-nitro-2-furyl)-5-methyl-4-(3H)-pyrimidinone was thereby obtained in good yield.

Variant D:

One g. 5-nitro-2-furamidine hydrochloride and an equimolar amount of the sodium salt of α-formyl-propionic acid ethyl ester were stirred in absolute alcohol, while heating under reflux. After 2 hours, the reaction mixture was cooled and the precipitate filtered off using suction and washed with water. The 2-(5-nitro-2-furyl)-5-methyl-4-(3H)-pyrimidinone thusly obtained was recrystallized from dimethyl formamide/alcohol. 2-(5-nitro-2-furyl)-5-methyl-4-(3H)-pyrimidine having a melting point of 306°–315° C. (decomp.) was obtained in a yield of 0.25 g.

EXAMPLE 4

2-(5-Nitro-2-furyl)-5-hydroxy-pyrimidine 0.5 g. 2-(5-nitro-2-furyl)-5-acetamino-pyrimidine prepared by the method described in example 1 was heated with 4 ml. 5N hydrochloric acid in 4 ml. dioxan for 5 hours at a temperature of 100° C. The reaction mixture was thereafter evaporated in a vacuum, the residue digested with 2N hydrochloric acid, filtered off with suction and washed with water. There were obtained 0.4 g. (96 percent of theory) 2-(5-nitro-2-furyl)-5-hydroxy-pyrimidine which, following recrystallization from dimethyl formamide/water, had a melting point of >335° C. (decomp.).

EXAMPLE 5

The following compounds were prepared in a manner analogous to that described in example 1:
2-(5-nitro-2-furyl)-4-methyl-6-acetamino-pyrimidine: m.p. 199°–204° C. (decomp.)

As starting material, there was used 2-(2-furyl)-4-methyl-6-acetamino-pyrimidine (m.p. 175°–177° C.), which was prepared by the following reaction: 2-(2-furyl)-4-methyl-6-chloropyrimidine was reacted with aqueous ammonia in an autoclave at a temperature of 150° C. The 2-(2-furyl)-4-methyl-6-amino-pyrimidine (m.p. 176°–178° C.) thusly obtained was then heated with acetic anhydride.

2-(5-nitro-2-furyl)-4-acetamino-pyrimidine: m.p. 277°–279° C. (decomp.)

As starting material, there was used 2-(2-furyl)-4-acetamino-pyrimidine (m.p. 192°–196° C.) which had been prepared by the following reaction: 2-(2-furyl)-4-(3H)-pyrimidinone was reacted with phosphorus oxychloride to give 2-(2-furyl)-4-chloropyrimidine (m.p. 80°–82° C.). Following the ammonolysis thereof at a temperature of 150° C. with aqueous ammonia in an autoclave, there was obtained 2-(2-furyl)-4-amino-pyrimidine (m.p. 151°–154° C.), which was thereafter reacted with acetic anhydride.

EXAMPLE 6

2-(5-Nitro-2-furyl)-4-methyl-6-amino-pyrimidine

Using 2-(5-nitro-2furyl)-4-methyl-6-acetamino-pyrimidine which had been prepared according to the method described in example 5, there was obtained, by boiling for 2 hours with alcoholic hydrochloric acid and subsequent neutralization, 2-(5-nitro-2-furyl)-4-methyl-6-amino-pyrimidine, which had a melting point of 251°–255° C. (decomp.).

In an analogous manner, by the saponification of 2-(5-nitro-2-furyl)-4-acetamino-pyrimidine, with alcoholic hydrochloride acid and subsequent neutralization, there was obtained 2-(5-nitro-2-furyl)-4-amino-pyrimidine, which had a melting point of 295°–310° C. (decomp.).

The bacteriostatic activity of the compounds in accordance with the invention was evaluated in vitro with respect to the organisms as set out in the following table.

The absolute bacteriostatic minimal concentration was determined for the following compounds of the invention and for four known or comparison compounds as hereinafter set out:

A. 2-(5-nitro-2-furyl)-5-methyl-4(3H)-pyrimidinone
B. 2-(5-nitro-2-furyl)-pyrimidine
C. 2-(5-nitro-2-furyl)-4,5-dimethyl-6-(1H)-pyrimidinone
D. 2-(5-nitro-2-furyl)-4-methyl-6-(1H)-pyrimidinone
E. 2-(5-nitro-2-furyl)-5-ethyl-4-(3H)-pyrimidinone
F. 2-(5-nitro-2-furyl)-4-methyl-pyrimidine
G. 2-(5-nitro-2-furyl)-4-(3H)-pyrimidinone
H. 2-(5-nitro-2-furyl)-4-methyl-6-acetamino-pyrimidine
I. 2-(5-nitro-2-furyl)-4-methyl-6-amino-pyrimidine
J. 2-(5-nitro-2-furyl)-4-acetamino-pyrimidine
K. 2-(5-nitro-2-furyl)-4-amino-pyrimidine
L. 2-(5-nitro-2-furyl)-5-methyl-pyrimidine
M. 2-(5-nitro-2-furyl)-4-methoxy-5-methyl-pyrimidine
N. 2-(5-nitro-2-furyl)-5-acetamino-pyrimidine
O. 2-(5-nitro-2-furyl)-5-amino-pyrimidine
P. 2-(5-nitro-2-furyl)-4-acetamino-5-methyl-pyrimidine
Q. 2-(5-nitro-2-furyl)-5-hydroxy-pyrimidine
R. 2-(5-nitro-2-furyl)-4,6-dimethyl-pyrimidine (known from U.S. Pat. No. 3,096,332)
S. Furacin—trade name for nitrofurazone 5-nitro-2-furaldehyde-semicarbazone—Eaton Laboratories Norwich, New York
T. Furoxon—trade name for furazolidone 3-(5-nitro-furfurylideneamino)-2-oxazolidinone—Eaton Laboratories, Norwich, New York
U. Furadantin—trade name for nitrofurantoin—(N-(5-nitro-2-furfurylidene)-1-aminohydantoin)—Eaton Laboratories, Norwich, N.Y.

The results are set out in the following table:

TABLE I.—BACTERIOSTATIC ACTIVITY IN VITRO

| Organism class | Organism | Absolute bacteriostatic minimal concentration in µg./ml. | | | | | | | | | | | | | | | | | | | | |
|---|---|---|---|---|---|---|---|---|---|---|---|---|---|---|---|---|---|---|---|---|---|
| | | A | B | C | D | E | F | G | H | I | J | K | L | M | N | O | P | Q | R | S | T | U |
| Gram positive organisms | *Staphylococcus aureus*, SG 511 (12) | 8 | 8 | 16 | 16 | 8 | 4 | 8 | 1 | 2 | 2 | 1 | 16 | 8 | 0.5 | 2 | 8 | 8 | 4 | 8 | 2 | 4 |
| | *Staphylococcus aureus* (97) | 2 | | | | | | | | | | | | | | | | | | 4 | 0.125 | 4 |
| | *Streptococcus pyogenes, Aronson* (75) | 4 | 8 | 16 | 32 | 64 | 64 | 8 | 0.25 | 2 | 1 | 2 | 8 | 8 | 0.5 | 4 | 8 | | 16 | 2 | 4 | 4 |
| | *Streptococcus faecalis* (155) | 8 | 256 | 16 | 16 | 16 | 256 | 16 | 0.5 | 2 | 2 | 1 | 64 | 1 | 0.5 | 2 | 4 | 4 | 4 | 128 | 16 | 4 |
| | *Streptococcus faecalis* (156) | 16 | | | | | | | | | | | | | | | | | | | 16 | 2 | 8 |
| Gram negative organisms | *Escherichia coli* (18) | 1 | 0.062 | 8 | 8 | 8 | 0.25 | 2 | 0.125 | 2 | 2 | 0.062 | 1 | 0.5 | 0.125 | 0.5 | 1 | 8 | 1 | 8 | 0.125 | 4 |
| | *Escherichia coli* (106) | 0.125 | | 0.5 | 0.5 | 0.5 | | 0.5 | | | | | | | | | | 2 | 0.5 | 2 | 0.125 | 2 |
| | *Aerobacter aerogenes* (91) | 0.25 | | | | | | | | | | | | | | | | | | | 8 | 0.25 | 8 |
| | *Aerobacter aerogenes* (167) | 2 | | | | | | | | | | | | | | | | | | | 8 | | 32 |
| | *Pseudomonas aeruginosa* (55) | >128 | | >128 | >32 | 128 | | >64 | | | | | | | | | | >64 | >64 | 256 | 64 | 128 |
| | *Pseudomonas aeruginosa* (71) | >64 | 8 | 128 | 128 | 128 | 32 | >64 | 16 | 128 | 8 | 4 | >64 | >64 | 8 | >64 | >64 | >64 | >32 | 128 | 64 | >128 |
| | *Pseudomonas aeruginosa* (164) | >128 | | >128 | >32 | 128 | | >64 | | | | | | | | | | >64 | >32 | >256 | 64 | >64 |
| | *Pseudomonas aeruginosa* (194) | >128 | | 64 | >32 | >32 | | >64 | | | | | | | | | | >64 | >32 | >128 | >64 | >32 |
| | *Pseudomonas aeruginosa* (195) | >256 | | >128 | 64 | >64 | | >64 | | | | | | | | | | >64 | >32 | 256 | >64 | >64 |
| | *Pseudomonas aeruginosa* (267) | >128 | | >32 | 64 | >32 | | 32 | | | | | | | | | | >32 | >32 | >128 | >64 | >32 |
| | *Proteus vulgaris* (206) | 2 | | 1 | 4 | 8 | | 16 | | | | | | | | | | 128 | >32 | >32 | 2 | 32 |
| | *Proteus vulgaris* (207) | 32 | | 32 | 32 | 64 | | 64 | | | | | | | | | | 128 | 0.5 | 32 | 16 | 64 |
| | *Proteus vulgaris* (208) | >128 | | >256 | >64 | >128 | | 128 | | | | | | | | | | >128 | 4 | 32 | 16 | 64 |
| | *Proteus mirabilis* (279) | 64 | | 128 | >64 | >128 | | 64 | | | | | | | | | | >128 | 16 | 32 | 16 | 128 |
| | *Proteus mirabilis* (281) | 128 | | 256 | 128 | 128 | 128 | 128 | | | | | | | | | 256 | >128 | 32 | 32 | 32 | 128 |
| | *Proteus mirabilis* (298) | 128 | 128 | 256 | 128 | 128 | 128 | 128 | 64 | 32 | 128 | 8 | 256 | 256 | 8 | 64 | 256 | >256 | >128 | 64 | 32 | 128 |

In addition, the following compounds were evaluated with respect to their bacteriostatic activity in urine of rats following oral administration. The result of this experiment are set out in table II which follows:

TABLE II.—BACTERIOSTATIC ACTIVITY OF THE URINE AND OF THE EXCRETED AMOUNT OF ACTIVE SUBSTANCE IN THE URINE OF RATS FOLLOWING ORAL ADMINISTRATION

1. Bacteriostatic maximum dilution of urine against *Escherichia coli* (106) determined in 50 ml. urine samples 22 hours after 20 mg. test compound per kg. body weight had been orally administered. 6 rats were employed for each experiment and every value recorded in the table represents the results thereby obtained.
2. The same experiment with the amount of antibacterial active substance excreted in the urine (in percent administered).

|   | A | C | D | E | G | Q | R | S | T | U |
|---|---|---|---|---|---|---|---|---|---|---|
| 1 | 1:208 | 1:33 | 1:76 | 1:43 | 1:183 | 1:45 | 1:18 | 1:5 | 1:6 | 1:54 |
|   | 1:208 | 1:25 | 1:99 | 1:80 | 1:101 | 1:54 | 1:38 | 1:5 | 1:2 | 1:30 |
|   | 1:354 | 1:77 | 1:98 |   |   | 1:42 | 1:34 |   | 1:4 | 1:41 |
|   | 1:106 | 1:44 | 1:146 |   |   | 1:49 |   |   | >1:2 | 1:19 |
|   | 1:124 | 1:54 |   |   |   |   |   |   | >1:2 | 1:40 |
|   | 1:280 |   |   |   |   |   |   |   | 1:3 | 1:21 |
| 2 |   |   |   | 12 | 24 |   |   | 2.7 | 0.2 | 27 |
|   | 12 |   | 20 | 12 | 14 |   | 2.2 | 2.9 | 0.07 | 30 |
|   | 16 |   | 20 |   |   | 27 | 1.9 |   | 0.2 | 36 |
|   | 5.2 | 6.7 | 33 |   |   | 25 |   |   | 0.05 | 27 |
|   | 8.2 | 6.7 |   |   |   |   |   |   | 0.04 | 46 |
|   | 18 |   |   |   |   |   |   |   | 0.09 | 31 |

The acute oral toxicity was determined in mice. the results are shown in table III.

TABLE III

| COMPOUND | |
|---|---|
| Furadantin (u¹) | LD₅₀=250 mg/kg. |
| Furadantin (u²) | LD₅₀=138 mg./kg. |
| A | LD₅₀=>1000 mg./kg. |
| C | LD₅₀=>200 mg./kg. |
| D | LD₅₀=303 mg./kg. |
| E | LD₅₀=>200 mg./kg. |
| G | LD₅₀=>200 mg./kg. |
| Q | LD₅₀=>200 mg./kg. |

¹ Published value 1964
² Unpublished value 1968

As can be seen from table III, the toxicity of the compounds of the invention is lower than that of furadantin. While the bacteriostatic activity of both the known and novel compounds is quite similar, the novel compounds have a much better activity in vivo as compared to the known comparison compounds.

The compounds in accordance with the instant invention are anti-microbials and have been found to be bactericidal to the pathogens found in surface infections, gram negative as well as gram positive. They additionally have utility as agents for routine treatment of acute and chronic bacterial infections of the urinary tract, including those caused by Proteus ap. Further they lend themselves because of their properties to use in the prevention of treatment of mixed surface infections of wounds, severe burns, cutaneous ulcers, pyodermas, osteomyelitis, preparation of wounds and burns for skin grafting and prevention of infection of grafts and donor sites.

The compounds of the invention can be employed in the form of aqueous solutions or suspensions thereof, as for instance, in the form of an 0.01–0.05 percent aqueous suspension or solution; in the form of solutions in nonaqueous, hygroscopic liquid vehicles such as polyethylene glycol, for instance, 0.1–0.5 percent solutions in polyethylene glycol; incorporation into a water-soluble ointmentlike base (concentration 0.1–0.5 percent or in a powder base composed for instance of water-soluble polyethylene glycols (concentration 0.1–0.5 percent); or in a form suitable for ingestion. Thus, a preferred form is a tablet containing 50–200 mg. of active compound. Depending on the condition, symptomatic and laboratory responses 100–400 mg. per day can be administered. Another preferred form or orally administering the compounds of the invention is in the form of a suspension thereof in a water miscible flavored gel. Such a gel can contain from 1–10 mg. of compound per cc.

We claim:
1. 5-nitrofuran derivative and nontoxic acid addition salts thereof, said nitrofuran derivative having the formula:

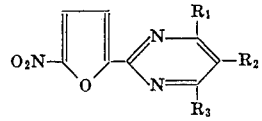

in which $R_1$ and $R_2$ each represent a member selected from the group consisting of hydrogen, hydroxyl, lower alkyl, lower alkoxy, amino and acetylamino and $R_3$ is a member selected from the group consisting of hydrogen, hydroxyl, lower alkoxy, amino and acetylamino; wherein at least one of the radicals $R_1$, $R_2$ and $R_3$ is hydroxyl.

2. Compound as claimed in claim 1 wherein only one of $R_1$, $R_2$ and $R_3$ is hydroxyl.

3. A compound according to claim 1 designated 2-(5-nitro-2-furyl)-5-methyl-4-(3H)-pyrimidinone.

4. A compound according to claim 1 designated 2-(5-nitro-2-furyl)-4,5-dimethyl-6-(1H)-pyrimidinone.

5. A compound according to claim 1 designated 2-(5-nitro-2-furyl)-4-methyl-6-(1H)-pyrimidinone.

6. A compound according to claim 1 designated 2-(5-nitro-2-furyl)-5-ethyl-4-(3H)-pyrimidinone.

7. A compound according to claim 1 designated 2-(5-nitro-2-furyl)-4-(3H)-pyrimidinone.

8. A compound according to claim 1 designated 2-(5-nitro-2-furyl)-5-hydroxy-pyrimidine.

* * * * *

UNITED STATES PATENT OFFICE
CERTIFICATE OF CORRECTION

Patent No. 3,621,022 Dated November 16, 1971

Inventor(s) Herbert Berger, Rudi Gall, Hartmut Merdes, Kurt Stach, Wolfgang Voemel and Winfriede Sauer It is certified that error appears in the above-identified patent and that said Letters Patent are hereby corrected as shown below:

Abstract, last line
"track" should be --tract--

Col. 1, line 20 (Spec. p. 2, line 15)
"THe" should be --The--

Col. 1, line 73 (Spec. p. 4, line 7)
"$R_1$" (second occurrence) should be --$R_2$--

Col. 4, line 12 (Spec. p. 10, line 1)
"slat" should be --salt--

Col. 10, line 1 (Spec. p. 28, line 23)
"ointmentlike" should be --ointment-like--

Signed and sealed this 23rd day of May 1972.

(SEAL)
Attest:

EDWARD M. FLETCHER, JR.
Attesting Officer

ROBERT GOTTSCHALK
Commissioner of Patents